Oct. 30, 1962   J. VANI   3,060,473
VEHICLE WASHER
Filed Aug. 22, 1960   4 Sheets-Sheet 1

INVENTOR:
James Vani,
BY
Erin Freeman & Molinare
ATTORNEYS.

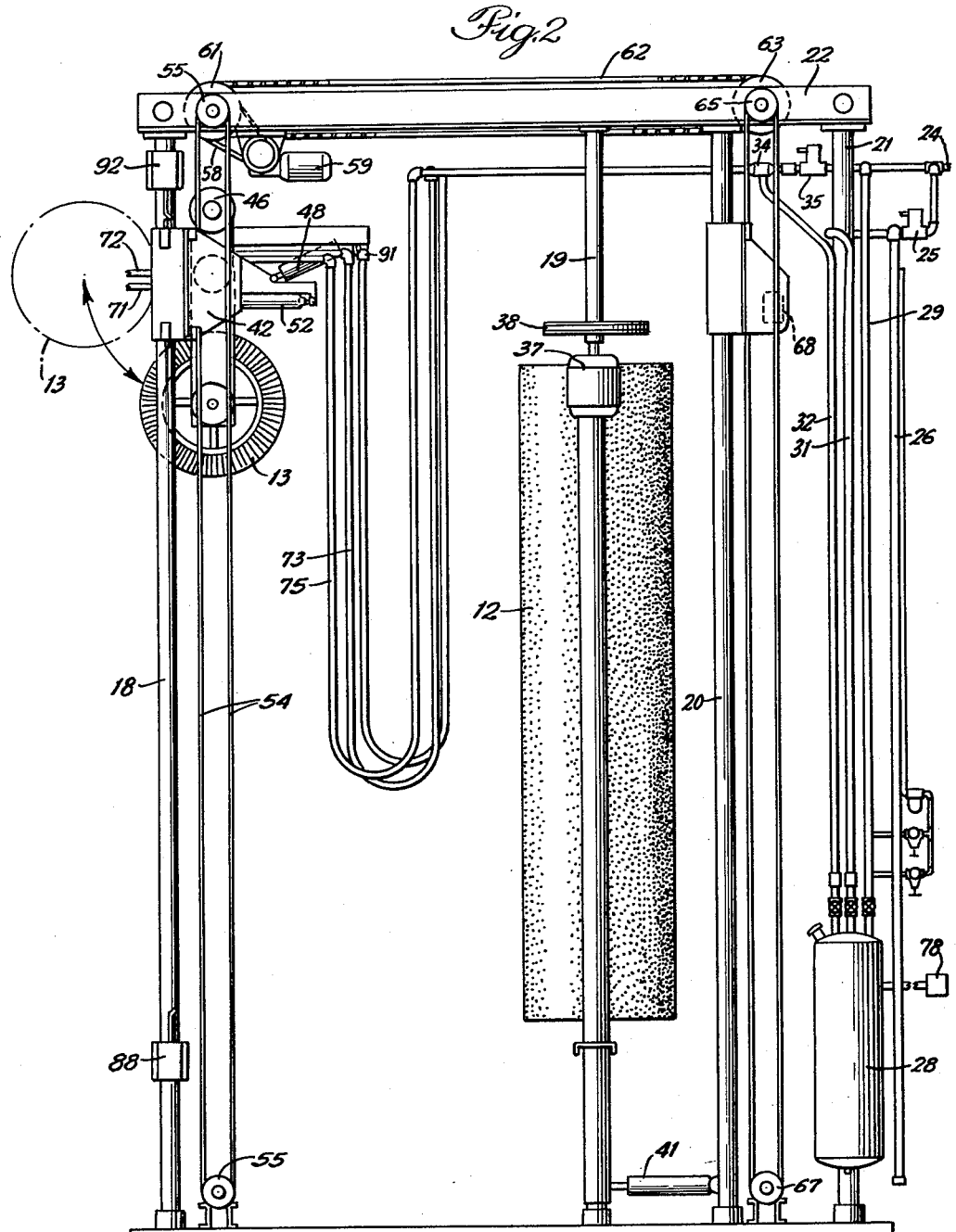

Oct. 30, 1962 J. VANI 3,060,473
VEHICLE WASHER
Filed Aug. 22, 1960 4 Sheets-Sheet 3

INVENTOR:
James Vani,
BY
ATTORNEYS.

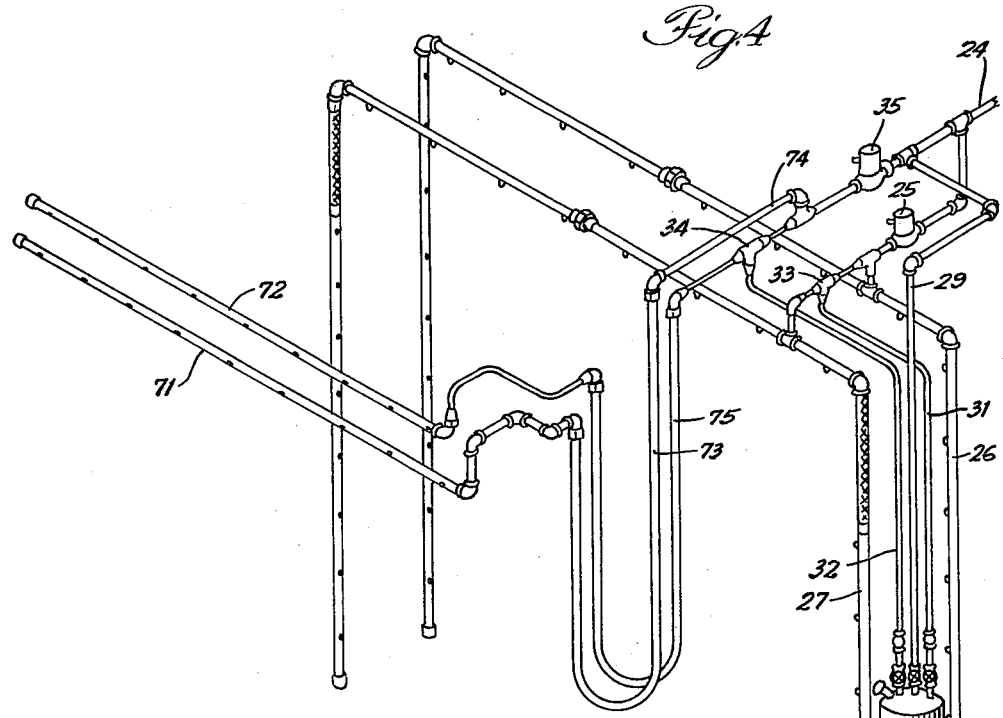
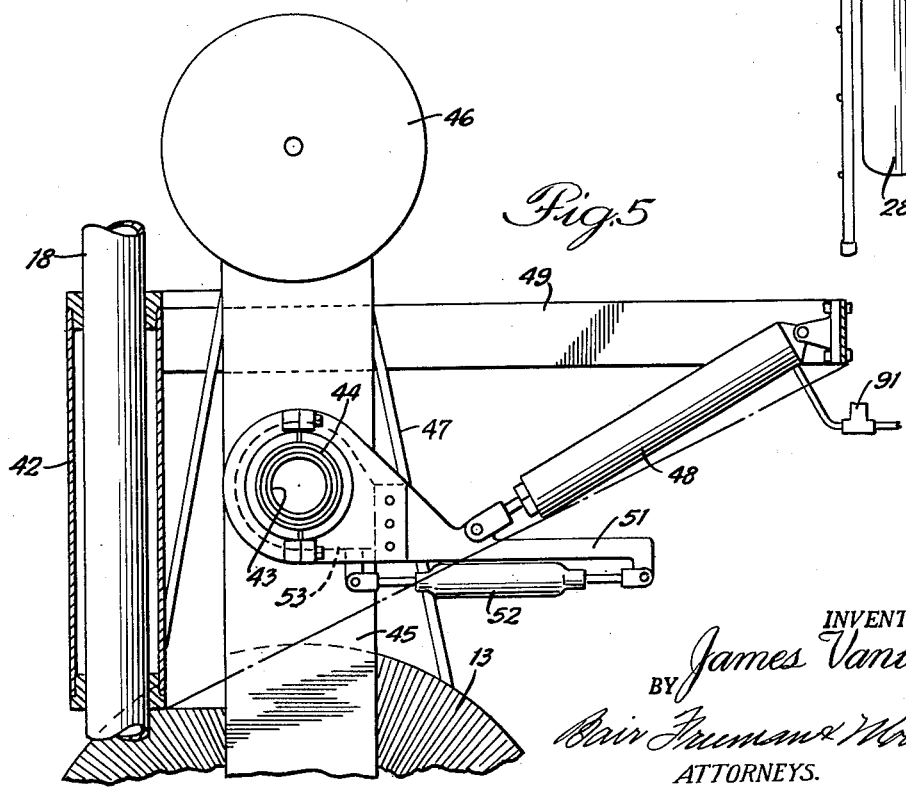

United States Patent Office 3,060,473
Patented Oct. 30, 1962

3,060,473
VEHICLE WASHER
James Vani, Midlothian, Ill., assignor to Service Metal Fabricators, Inc., Chicago, Ill., a corporation of Illinois
Filed Aug. 22, 1960, Ser. No. 51,169
6 Claims. (Cl. 15—21)

This invention relates to vehicle washers and more particularly to apparatus for washing the top, sides and back of truck, trailer and bus bodies, and the like.

Vehicle washers as presently constructed generally comprise spaced vertical brushes for washing the sides of a vehicle and a horizontal upper brush for washing the top of the vehicle as the vehicle is moved through the washing apparatus. In large vehicles, such as trucks, trailers, and the like, which have high, generally vertical back surfaces such apparatus cannot wash the backs, leaving this task to be performed by hand.

It is accordingly one of the objects of the present invention to provide a vehicle washer in which a brush rotatable on a horizontal axis is movable vertically in engagement with the back of a vehicle to wash it. According to a feature of the invention the same brush which washes the top of the vehicle may be moved vertically over the back of the vehicle also to wash it.

A further object is to provide a vehicle washer in which the elevation of the top washing brush is automatically adjusted in response to the height of the vehicle properly to engage the tops of vehicles of different heights.

According to a feature of the invention, the top and back washing brush is supported on depending pivoted arms for washing and the arms are swung outward to a generally horizontal position and are moved bodily in a vertical direction for back washing.

Preferably the arms are yieldingly held in either of their washing positions by means of shock absorbing devices to accommodate minor irregularities or maladjustments.

Figure 1:
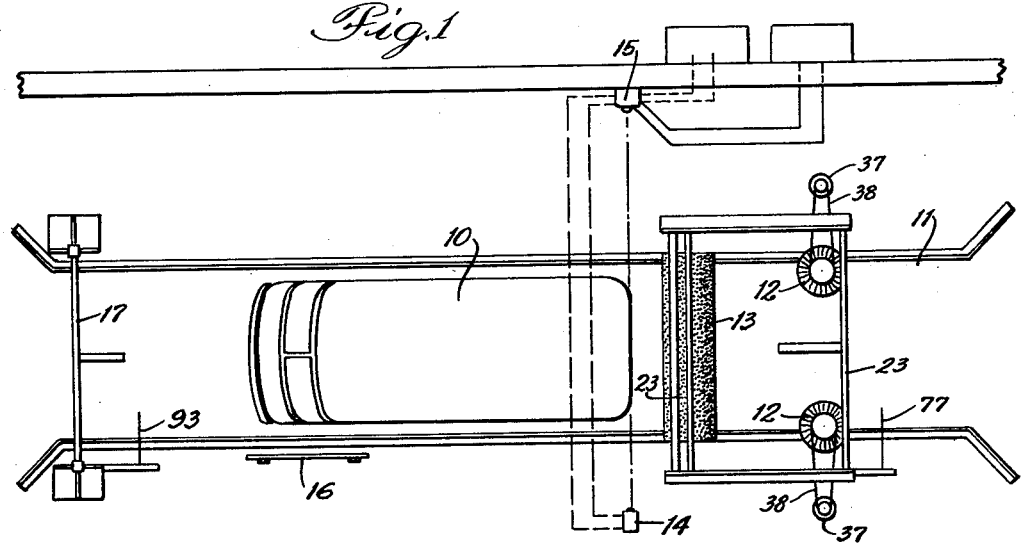
Figure 6:
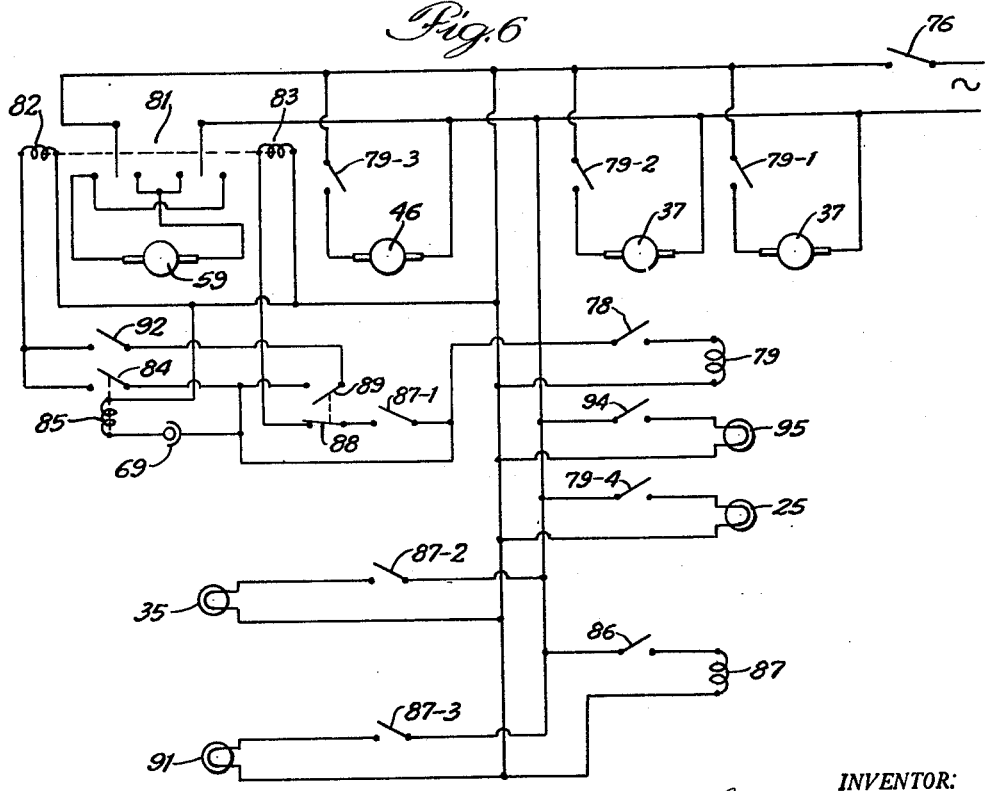
Figure 3:
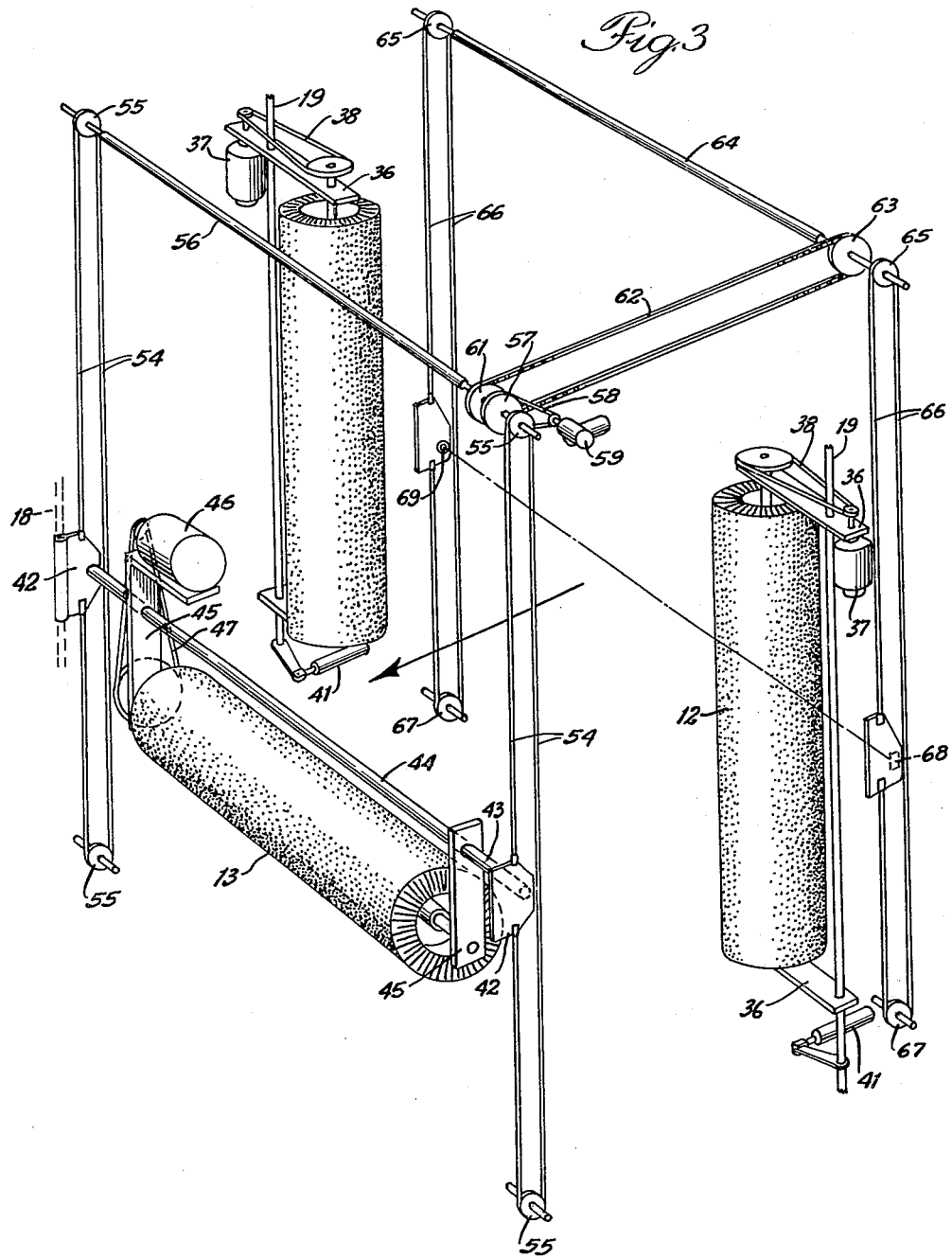

The above and other objects and features of the invention will be more readily apparent from the following description when read in connection with the accompanying drawings, in which:

FIGURE 1 is a top plan view of a vehicle washer embodying the invention;
FIGURE 2 is a side elevation;
FIGURE 3 is a partial perspective view illustrating the brush moving means;
FIGURE 4 is a partial perspective view illustrating the pipe;
FIGURE 5 is a side elevation with parts in section showing the mounting of the top and back brush; and
FIGURE 6 is a simplified wiring diagram.

As shown first in FIGURE 1, a vehicle indicated generally at 10, such as a truck, trailer, bus, or the like, is adapted to have its side, top and back washed as it passes along a trackway 11 from the right to left of the apparatus. The sides of the vehicle are washed by rotary brushes 12 mounted at opposite sides of the trackway and the top and back of the vehicle are washed by a similar brush 13 which moves over the top of the vehicle as it travels through the apparatus and which is moved vertically over the back of the vehicle immediately after the vehicle has passed through the principal part of the apparatus.

In the operation of the invention, the vehicle is moved through the apparatus either under its own power or by a conveyor until its back vertical surface reaches a predetermined position and is then stopped during the back washing operation. To indicate to an operator when the vehicle has reached the desired position for back washing, a signal device is provided, shown as a light source 14, at one side of the trackway and a photosensitive cell 15 at the opposite side thereof which are connected in circuit to operate a suitable signal, not shown, such as a signal lamp, a bell, or the like. As the vehicle is being driven through the apparatus, it intercepts the light beam between the source 14 and the cell 15 with the light beam being re-established as soon as the back of the vehicle passes the line between the light source and the cell. When this occurs, a signal will be given that the vehicle is in proper position for back washing and the vehicle may be stopped while the back washing is initiated. As a matter of convenience, a control device 16 may be mounted in a position to be engaged and operated by an operator in the cab of the vehicle when it is stopped in the back washing position to initiate the back washing operation. After the back washing is completed, the vehicle is moved along the trackway past a final rinse unit 17 with the washing operation being completed.

The main washing unit, as best seen in FIGURE 2, comprises an inverted U-shaped frame including upright posts 18, 19, 20 and 21 which may be in the form of cylindrical pipes or rods extending vertically in pairs at opposite sides of the trackway and connected at their tops by longitudinal beams 22 which are in turn rigidly connected by cross beams 23, as seen in FIGURE 1. Water for washing is supplied through a pipe 24 from any suitable source, such as a city water supply, and flows through a solenoid valve 25 into a pre-rinse loop 26 which is preferably of inverted U-shape and is provided throughout its inner surfaces with a series of spaced spray nozzles to spray water uniformly over the top and sides of the vehicle. A suitable detergent is adapted to be similarly sprayed over the vehicle through an inverted U-shaped spray loop 27 spaced slightly forward of the pre-rinse loop 26 from a detergent tank 28. Detergent solution is forced through the tank 28 by water entering the top thereof through a pipe 29 and the detergent solution flows from the tank through pipes 31 and 32. The pipe 31 leads to a venturi or aspirating unit 33 connected to receive water from the inlet 24 when the valve 25 is open and to supply the detergent-water mixture to the spray loop 27. The pipe 32 leads to a similar venturi mixer 34 which is supplied with water from the inlet pipe through a solenoid valve 35 to supply water for washing the back of the vehicle, as described more fully hereinafter.

The side brushes 12 are supported for swinging movement toward and away from the sides of the vehicle and are driven for washing the vehicle sides in the manner best seen in FIGURE 3. As there shown, each of the side brushes is rotatably supported on horizontally extending swinging arms 36 which are mounted for pivotal movement in horizontal planes on the vertical frame members 19. Each of the brushes is driven by a motor 37 carried by one of the arms 36 through a belt 38, although it will be apparent that if desired other types of driving means could be employed. The arms 36 are resiliently biased through fluid motors 41 in a direction to press against the sides of a vehicle passing through the washer to maintain proper washing pressure thereagainst. At the same time, the fluid motors 41 will yield in response to pressure on the brushes so that vehicles of different widths may properly be washed in the apparatus without the necessity of separate manual adjustments.

The top brush 13 is supported, as best seen in FIGURES 3 and 5, on a carriage vertically mounted on the frame. The carriage, as shown, comprises side members 42 which are vertically slidable on the forward vertical posts 18 of the frame and which are connected by a cross rod 43. A tube 44 is carried by the cross rod 43 for pivotal movement thereon and has secured thereto arms 45 in the free ends of which the brush 13 is journalled.

The brush 13 is driven by a motor 46 carried by an extension of one of the arms 45 opposite to the brush and connected to the brush through a belt 47. Due to this mounting, the motor serves as a counterweight to partially balance the weight of the brush 13 as it swings about the cross rod 43, it being apparent that additional counterweights could be secured to and extend from the tube 44, is desired.

In order to swing the arms 45 about the cross rod 43 from a vertical depending position to a horizontal back washing position, as shown in dotted lines in FIGURE 2, a fluid motor 48 is provided connected at one end to an arm 49 on one of the sides 42 with its opposite end connected to an arm 51 which is freely rotatable on the cross rod 43. The arm 51 is connected through a conventional fluid type shock absorber 52 to a bracket 53 secured to the sleeve 44. When the cylinder 48 is energized by supplying fluid to the upper outer end thereof, it will swing the arm 51 clockwise from the position shown in FIGURE 5 and through the shock absorber 52 will swing the arms 45 clockwise to elevate the brush 13 to the dotted line back washing position shown in FIGURE 2. It will be apparent that in either top washing or back washing the shock absorber 52 may yield to allow the brush to swing slightly by swinging the arms 45 to accommodate minor irregularities or maladjustments in the position of the brush.

The brush is adapted to be moved vertically for a back washing operation and also for adjustment to accommodate vehicles of different heights through the mechanism best seen in FIGURE 3. As there shown, the sides 42 are connected to endless cables 54 running over pulleys 55 at the top and bottom portions of the frame respectively. The pulleys 55 at the top of the frame are secured to a cross shaft 56 which additionally carries a drive pulley 57 reversibly driven through a belt 58 by a reversible motor 59 and a coupling pulley 61 connected through a belt or chain 62 to a drive pulley 63 at a second cross shaft 64 near the entrance end of the unit. The cross shaft 64 carries pulleys 65 over which endless cables 66 are trained with the cable 66 being stretched over lower pulleys 67 near the bottom of the frame. One of the cables 66 carries a light source indicated at 68 and the other carries a light sensitive cell 69. These parts cooperate to adjust the vertical level of the brush 13 when the arms 45 are in their dependent position for top washing, as described hereinafter. In addition, through operation of the motor 59 the brush 13 may be moved bodily in a vertical direction over the back of a vehicle to wash it.

For effectively washing the back of the vehicle a carriage for the brush 13 also carries horizontally extending spray pipes, as indicated at 71 and 72 for water and detergent respectively. As best seen in FIGURE 4, the water spray pipe 71 is connected through a flexible hose 73 to a pipe 74 which branches off from the water supply pipe 24 just past the solenoid valve 35. The detergent spray pipe 72 is similarly connected through a flexible hose 75 to the venturi mixer 34 to receive a detergent mixture therefrom. Due to the flexible hoses 73 and 75 the spray pipes 71 and 72 can move vertically with the brush 13 during a back washing operation to supply water and detergent solution to the back of the vehicle as it is being washed.

The several parts of the apparatus are controlled in an operating cycle by a control circuit, a simplified version of which is illustrated in FIGURE 6. As shown, the system may be powered from any desired source through a main control switch 76 which may be manually closed to place the apparatus in condition for operation. As a vehicle approaches the washing apparatus, its front portion will engage a trip 77, as shown in FIGURE 1, to close a switch 78 which controls energization of a relay 79. When the relay 79 is energized it closes normally open switches 79–1 and 79–2 to energize the driving motors 37 for the two side brushes 12. At the same time, a normally open switch 79–3 is closed to energize the driving motor 46 for the top brush. Switch 79–4 is also closed to energize and open the valve 25 to supply water to the pre-rinse loop 26 and to supply a detergent solution to the detergent loop 27. At this time, the several cleaning brushes are in operation so that as the vehicle moves through the apparatus the sides and back thereof will be cleaned in the usual manner by the side and top brushes and by the water and detergent solution sprayed onto the vehicle.

The top brush 13 is adjusted to a proper elevation to engage the top of the vehicle regardless of variations in the vehicle height through the automatic control mechanism, including the photocell 69. For this purpose the reversible motor 59 is connected to the power source through a reversing switch indicated generally at 81 which is shifted to the left to elevate the carriage and the brush 13 by a solenoid 82 and to the right to lower the carriage and the brush 13 by a solenoid 83. The solenoid 82 is connected directly to one side of the power source and to the other side thereof through a normally closed switch 84 which is opened by a coil 85 when it is energized. The coil 85 is connected in circuit with the photocell 69 to be energized when light from the source 68 reaches the cell to open the switch 84 and to be de-energized to allow the switch 84 to close when no light from the source reaches the cell. When the vehicle enters the unit if its top is above the level of the source 68 and photocell 69, the light beam between the source and the photocell will be interrupted to de-energize the coil 85 and allow the switch 84 to close. At this time, the coil 82 will be energized to throw the switch 81 to its left-hand position thereby to energize the reversible motor 59 in a direction to elevate the carriage and the brush 13. Elevation of the carriage and brush will continue until the light source and the photocell reach a level just above the top of the vehicle at which time the light beam will again strike the photocell to energize the coil 85 and open the switch 84. By properly positioning the photocell 69 and light source 68 relative to the height of the brush 13 when the arms 45 are in their depending position, proper engagement of the brush with the top of the vehicle to wash it is automatically insured.

After the vehicle has passed through the initial washing operation to the position illustrated in FIGURE 1 for back washing, it will be stopped and the operator will manually close the switch 86 to energize the relay 87. Energizing of the relay 87 will close a normally open switch 87–1 to establish a circuit to the coil 83 through the switch 87–1 and lower limit switch 88. The lower limit switch 88, as shown in FIGURE 6, is a double switch including normally closed lower contacts indicated by the reference numeral 88 and normally open upper contacts 89 which are closed when the limit switch is operated. As shown in FIGURE 2, the limit switch 88 is mounted near the lower part of the frame to be engaged and operated by the carriage or by one of the sides 42 thereof when the carriage reaches a predetermined lower level sufficient to move the brush to the bottom part of the vehicle back. Energizing of the relay 87 also closes the switch 87–2 which controls the solenoid valve 35 to supply water and detergent solution to the spray pipes 71 and 72.

At the same time, the relay 87 closes switch 87–3 which energizes and opens a valve 91 which supplies operating fluid to the upper outer end of the fluid motor 48 to swing the arms 45 to their horizontal position in which the brush 13 will engage the back of the vehicle body at the top thereof.

At this time, the motor 59 will operate to move the carriage and the brush 13 downward while water and detergent are sprayed over the back of the vehicle and onto the brush 13 from the spray pipes 71 and 72. When the carriage reaches its lower limit it will engage and operate the switch 88 to open the lower contacts 88 and to close the upper contacts 89 which are in circuit with an upper limit switch 92. The upper limit switch 92 is open only when the carriage is in its uppermost position and is closed at all other times so that when the lower limit switch is operated the coil 82 will be energized through the upper limit switch 92 and the upper contacts 89 of the lower limit switch to reverse the motor 59 and move the carriage and brush 13 back up. This operation will continue until the upper limit switch 92 is reached and opened at which time the circuit to the motor 59 will be broken. The upper limit switch 92 could also be wired into the relay 87 to de-energize it when the carriage reaches the upper level of its movement to interrupt the supply of water and detergent solution to the spray pipes 71 and 72 and to close the valve 91.

At this time, washing of the vehicle is completed and it is ready for the final rinse. As the vehicle moves on through the apparatus its front part will engage a trip 93, as shown in FIGURE 1, to close a switch 94 shown in FIGURE 6. The switch 94 energizes a solenoid valve 95 which controls the supply of water to the final rinse loop 17 so that as the vehicle passes through this loop it will be sprayed with clear water in a final rinse operation to complete the cleaning thereof.

While one embodiment of the invention has been shown and described herein, it will be understood that it is illustrative only and not to be taken as a definition of the scope of the invention, reference being had for this purpose to the appended claims.

What is claimed is:

1. In a vehicle washer, a brush rotatable on a horizontal axis, means mounting the brush for bodily movement in a vertical path, power means to move the brush vertically, first control means for the power means responsive to the height of a vehicle to be washed to cause the power means to move the brush to a height corresponding to the vehicle height for washing the top of the vehicle, and second control means for the power means operable independently of the first control means in response to movement of a vehicle to a position in which its end is adjacent to the vertical path of travel of the brush to cause the power means to move the brush from said height downward to a minimum height corresponding to the bottom of the vehicle body and then upward to wash a vertical end surface of the vehicle body.

2. In a vehicle washer having an inverted U-shaped frame through which a vehicle to be washed may pass, a brush rotatable on a horizontal axis, a vertically movable carriage on the frame, arms pivoted on the carriage and carrying the brush at their free ends, means for swinging the arms from a dependent position to a horizontal position, the brush being adapted to engage and wash the top of a vehicle passing through the frame when the arms are in their dependent position, and means to move the carriage vertically on the frame when the arms are in their horizontal position to wash a vertical end surface of a vehicle.

3. The washer of claim 2 in which the swinging means includes a motor operable between two extreme positions and yieldable shock absorbing means connecting the motor to the arms.

4. The washer of claim 2 including indicating means responsive to movement of a vehicle through the frame to indicate when the vertical end surface of the vehicle is in a position to be engaged and washed by the brush as it is moved vertically.

5. In a vehicle washer having an inverted U-shaped frame through which a vehicle to be washed may pass, a brush rotatable on a horizontal axis, a vertically movable carriage on the frame, arms pivoted on the carriage and carrying the brush at their free ends, means for swinging the arms from a dependent position to a horizontal position, the brush being adapted to engage and wash the top of a vehicle passing through the frame when the arms are in their dependent position, means to move the carriage vertically on the frame when the arms are in their horizontal position to wash a vertical end surface of a vehicle, and spray means mounted on the carriage to spray cleaning liquid on the brush and the end of the vehicle as the carriage is moved vertically.

6. In a vehicle washer having an inverted U-shaped frame through which a vehicle to be washed may pass, a brush rotatable on a horizontal axis, a vertically movable carriage on the frame, arms pivoted on the carriage and carrying the brush at their free ends, means for swinging the arms from a dependent position to a horizontal position, the brush being adapted to engage and wash the top of a vehicle passing through the frame when the arms are in their dependent position, means to move the carriage vertically on the frame when the arms are in their horizontal position to wash a vertical end surface of a vehicle, and second means responsive to the height of a vehicle to be washed to move the carriage vertically on the frame when the arms are in their dependent position to move the brush to a position to engage and wash the top of a vehicle moving under it.

References Cited in the file of this patent

UNITED STATES PATENTS

| | | |
|---|---|---|
| 2,215,692 | Fleming | Sept. 24, 1940 |
| 2,321,983 | Brackett | June 15, 1943 |
| 2,610,342 | Griffiths | Sept. 16, 1952 |
| 2,803,025 | Morison | Aug. 20, 1957 |